(12) United States Patent
Forgues et al.

(10) Patent No.: US 10,209,381 B2
(45) Date of Patent: Feb. 19, 2019

(54) SYSTEMS AND METHODS FOR WIRELESS DATA ACQUISITION IN SEISMIC MONITORING SYSTEMS

(71) Applicant: CGG SERVICES SA, Massy (FR)

(72) Inventors: Eric Forgues, Bures-sur-Yvette (FR); Peter Maxwell, Missouri City, TX (US); Jason Jurok, East Grinstead (GB); Julien Cotton, Paris (FR)

(73) Assignee: CGG SERVICES SAS, Massy (FR)

( * ) Notice: Subject to any disclaimer, the term of this patent is extended or adjusted under 35 U.S.C. 154(b) by 182 days.

(21) Appl. No.: 15/119,224

(22) PCT Filed: Feb. 17, 2015

(86) PCT No.: PCT/IB2015/000348
§ 371 (c)(1),
(2) Date: Aug. 16, 2016

(87) PCT Pub. No.: WO2015/125015
PCT Pub. Date: Aug. 27, 2015

(65) Prior Publication Data
US 2017/0068006 A1    Mar. 9, 2017

Related U.S. Application Data

(60) Provisional application No. 61/941,508, filed on Feb. 19, 2014.

(51) Int. Cl.
*G01V 1/00* (2006.01)
*G01V 1/28* (2006.01)
(Continued)

(52) U.S. Cl.
CPC ............... *G01V 1/32* (2013.01); *G01V 1/223* (2013.01); *G01V 1/247* (2013.01); *H04W 4/006* (2013.01); *H04W 4/38* (2018.02); *H04W 84/18* (2013.01)

(58) Field of Classification Search
CPC . G01V 1/32; G01V 1/22; G01V 1/223; G01V 1/247; H04W 4/38; H04W 4/006
(Continued)

(56) References Cited

U.S. PATENT DOCUMENTS

| 3,806,864 A | 4/1974 | Broding et al. |
| 3,886,494 A | 5/1975 | Kostelnicek et al. |

(Continued)

FOREIGN PATENT DOCUMENTS

| CA | 2646308 A1 | 6/2009 |
| CN | 102768364 A | 7/2012 |

(Continued)

OTHER PUBLICATIONS

International Search Report in related International Application No. PCT/IB2015/000348, dated Sep. 1, 2015.
(Continued)

*Primary Examiner* — An Do
(74) *Attorney, Agent, or Firm* — Patent Portfolio Builders PLLC

(57) ABSTRACT

Systems and methods for wireless data acquisition in seismic monitoring systems are disclosed. The method includes obtaining a signal table for an emitted seismic signal, receiving seismic signal data from a receiver configured to transform seismic signals into seismic signal data, and storing the seismic signal data on a storage system. The method also includes determining a time span for the seismic signal data and generating a reduced data set based on the seismic signal data, the signal table, and the time span.

17 Claims, 4 Drawing Sheets

(51) Int. Cl.
  *G01V 1/32* (2006.01)
  *H04W 4/38* (2018.01)
  *G01V 1/22* (2006.01)
  *G01V 1/24* (2006.01)
  *H04W 4/00* (2018.01)
  *H04W 84/18* (2009.01)

(58) Field of Classification Search
  USPC .................................................. 702/2, 14, 16
  See application file for complete search history.

(56) References Cited

U.S. PATENT DOCUMENTS

| | | | |
|---|---|---|---|
| 4,202,048 A * | 5/1980 | Edwards | G01V 1/005 367/40 |
| 4,885,724 A | 12/1989 | Read et al. | |
| 6,061,299 A | 5/2000 | Grouffal et al. | |
| 6,219,620 B1 | 4/2001 | Park et al. | |
| 6,934,219 B2 | 8/2005 | Burkholder et al. | |
| 7,016,260 B2 | 3/2006 | Bary | |
| 7,124,028 B2 | 10/2006 | Ray et al. | |
| 7,209,407 B2 * | 4/2007 | Chamberlain | G01V 1/003 340/855.2 |
| 7,224,642 B1 | 5/2007 | Tran | |
| 7,242,294 B2 | 7/2007 | Warrior et al. | |
| 7,386,352 B2 | 6/2008 | Davis et al. | |
| 7,573,782 B2 | 8/2009 | Barakat | |
| 7,660,203 B2 | 2/2010 | Barakat et al. | |
| 7,773,457 B2 | 8/2010 | Crice et al. | |
| 7,804,737 B2 | 9/2010 | Thompson | |
| 7,869,444 B2 | 1/2011 | Menard et al. | |
| 8,325,561 B2 | 12/2012 | Bull et al. | |
| 8,547,796 B2 | 10/2013 | Wilcox et al. | |
| 2008/0137484 A1 | 6/2008 | Scott | |
| 2008/0219094 A1 | 9/2008 | Barakat | |
| 2009/0154289 A1 | 6/2009 | Johansen | |
| 2013/0016625 A1 | 1/2013 | Murias et al. | |

FOREIGN PATENT DOCUMENTS

| | | |
|---|---|---|
| EP | 0113220 A2 | 7/1984 |
| WO | 2013/134193 A2 | 9/2013 |

OTHER PUBLICATIONS

Written Opinion of the International Searching Authority in related International Application No. PCT/IB2015/000348, dated Sep. 1, 2015.
H. Bland et al., "Remote, Wireless, Permanent Seismic Stations: A Mountain Case", Crewes Research Report, 2004, vol. 16, pp. 1-9.
J. Makris et al., "OBS Technologies and Permanent Seismic Stations at Sea", Geophysical Research Abstracts, 2003, vol. 5, No. 13500, European Geophysical Society.

* cited by examiner

SYSTEMS AND METHODS FOR WIRELESS DATA ACQUISITION IN SEISMIC MONITORING SYSTEMS

CROSS-REFERENCE TO RELATED APPLICATION

The present application claims the benefit of priority under 35 U.S.C. § 119 from U.S. Provisional Patent Application Ser. No. 61/941,508, filed on Feb. 19, 2014, which is incorporated by reference in its entirety for all purposes.

TECHNICAL FIELD

The present disclosure relates generally to seismic exploration and, more particularly, to systems and methods for wireless data acquisition in seismic monitoring systems.

BACKGROUND

In the oil and gas industry, geophysical survey techniques are commonly used to aid in the search for and evaluation of subterranean hydrocarbon or other mineral deposits. Generally, a seismic energy source, or "seismic source," generates a seismic signal that propagates into the earth and is partially reflected and refracted by subsurface seismic interfaces between underground formations having different acoustic impedances. The reflections are recorded by seismic detectors, or "receivers," located at or near the surface of the earth, coupled in the ground by any method such as cementing or placement in bentonite, in a body of water, or at known depths in boreholes, and the resulting seismic data can be processed to yield information relating to the location and physical properties of the subsurface formations. Seismic data acquisition and processing generates a profile, or image, of the geophysical structure under the earth's surface. While this profile does not provide an accurate location for oil and gas reservoirs, it suggests, to those trained in the field, the presence or absence of them.

Various sources of seismic energy have been used to impart the seismic waves into the earth. Such sources have included two general types: 1) impulsive energy sources and 2) seismic vibrator sources. The first type of geophysical prospecting utilizes an impulsive energy source, such as dynamite or a marine air gun, to generate the seismic signal. With an impulsive energy source, a large amount of energy is injected into the earth in a very short period of time. In the second type of geophysical prospecting, a vibrator is used to propagate energy signals over an extended period of time, as opposed to the near instantaneous energy provided by impulsive sources. Except where expressly stated herein, "source" is intended to encompass any seismic source implementation, both impulse and vibratory, including any dry land or marine implementations thereof.

The seismic signal is emitted in the form of a wave that is reflected and refracted off interfaces between geological layers. The reflected and refracted waves are received by an array of geophones, or receivers, located at the earth's surface, which convert the displacement of the ground resulting from the propagation of the waves into an electrical signal recorded by means of recording equipment. The receivers typically receive data during the source's energy emission and during a subsequent "listening" interval. The recording equipment records the time at which each reflected and refracted wave is received. The seismic travel time from source to receiver, along with the velocity of the source wave, can be used to reconstruct the path of the waves to create an image of the subsurface. A large amount of data may be recorded by the recording equipment and the recorded signals may be subjected to signal processing before the data is ready for interpretation. The recorded seismic data may be processed to yield information relating to the location of the subsurface reflectors and the physical properties of the subsurface formations. That information is then used to generate an image of the subsurface.

Oil and gas reservoirs may be continuously surveyed to provide real-time monitoring of the reservoir. A continuous seismic monitoring system may consist of an array of receivers located near the reservoir and one or more sources. The sources continuously operate to emit a seismic signal. The receivers receive the reflected and refracted signal, which is recorded by recording equipment and then transmitted to a data processing location for storage and processing.

The data acquired by the recording equipment may be transmitted in several ways. In some systems, data is transmitted to the data processing location using a physical link, such as a buried cable. However, digging trenches and laying cable may be expensive, may interfere with surface or subsurface improvements such as roads, pipes, and other cabling, and may raise environmental concerns. In some systems, data is transmitted to the data processing location using a wireless link. However, the volume of data acquired by the recording equipment may be large compared to the transmission rates for the wireless link, which is often much lower than that for a physical link. In addition, the recording equipment may be battery-powered, which limits the amount of time the equipment can spend transmitting per day. Thus, it would be useful to provide methods and systems to reduce the amount of data sent to the data processing location over a wireless link.

SUMMARY

In accordance with one or more embodiments of the present disclosure, a method for seismic data acquisition includes obtaining a signal table for an emitted seismic signal, receiving seismic signal data from a receiver configured to transform seismic signals into seismic signal data, and storing the seismic signal data on a storage system. The method also includes determining a time span for the seismic signal data and generating a reduced data set based on the seismic signal data, the signal table, and the time span.

In accordance with another embodiment of the present disclosure, a seismic data acquisition system includes a processor, a memory communicatively coupled to the processor, a receiver configured to transform seismic signals into seismic signal data and a storage system. The system also includes instructions stored in the memory that, when executed by the processor, cause the processor to obtain a signal table for an emitted seismic signal; receive seismic signal data from the receiver; store the seismic signal data on the storage system; determine a time span for the seismic signal data; and generate a reduced data set based on the seismic signal data, the signal table, and the time span.

In accordance with another embodiment of the present disclosure, a non-transitory computer-readable medium includes instructions that, when executed by a processor, cause the processor to obtain a signal table for an emitted seismic signal, receive seismic signal data from a receiver configured to transform seismic signals into seismic signal data, and store the seismic signal data on a storage system. The instructions also cause the processor to determine a time span for the seismic signal data and generate a reduced data set based on the seismic signal data, the signal table, and the time span.

BRIEF DESCRIPTION OF THE DRAWINGS

For a more complete understanding of the present disclosure and its features and advantages, reference is now made to the following description, taken in conjunction with the accompanying drawings, which may include drawings that are not to scale and wherein like reference numbers indicate like features, in which.

DETAILED DESCRIPTION

Figure 1:
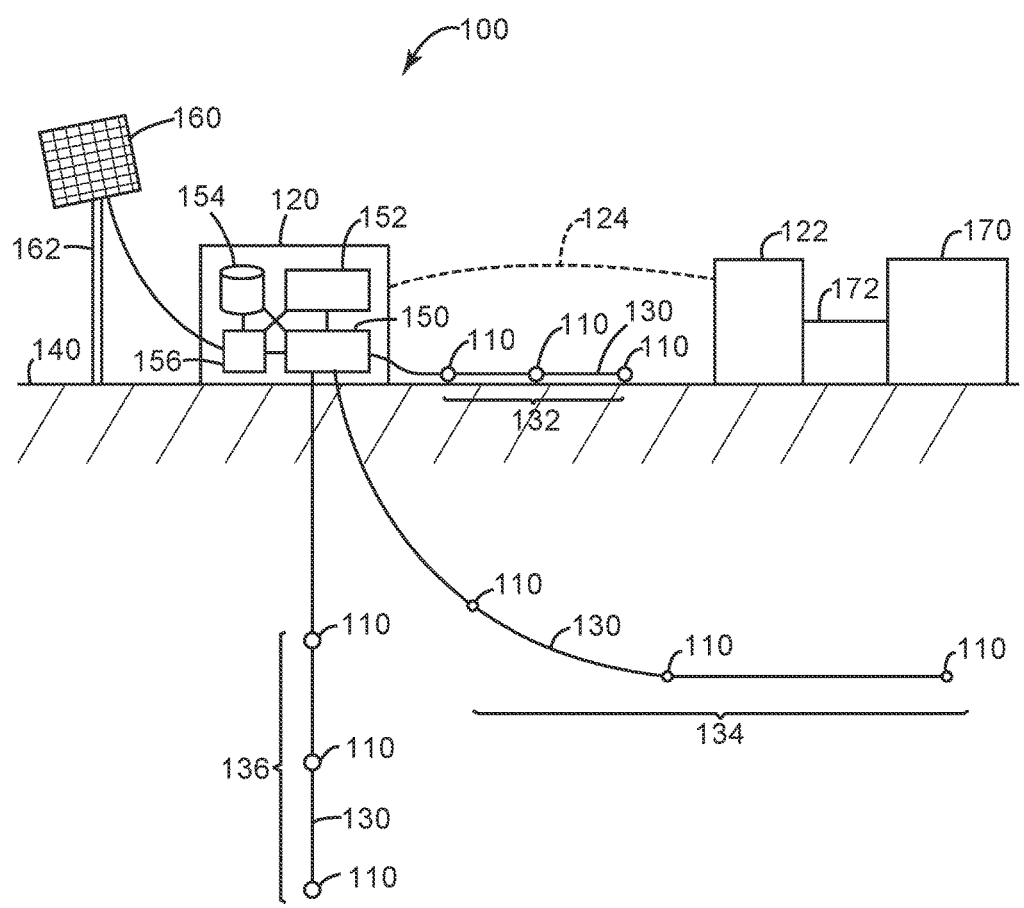
FIG. 1 illustrates an elevation view of an example data collection node in accordance with some embodiments of the present disclosure.

The present disclosure is directed to wireless data acquisition in seismic monitoring systems. A seismic monitoring system may be used to monitor a reservoir during the course of oil or gas production operations. For example, the seismic monitoring system may be used to monitor the reservoir as oil or gas is extracted from the reservoir. The seismic monitoring system may also be used to monitor the reservoir before, during, and after a steam, water, solvent, polymer, or any other suitable type of injection.

A seismic monitoring system may include one or more seismic sources and one or more data collection nodes. In a monitoring operation, each seismic source may emit a distinct seismic signal into the ground. The seismic signal from each source is reflected and refracted off interfaces between geological layers, and is ultimately detected by receivers associated with each of the data collection nodes. The reflected seismic signal may be digitized and transmitted to a data processing location for storage and processing to acquire information about subsurface structures.

In some embodiments, a particular range of frequencies may be useful to acquire information about subsurface structures. To cover the entire frequency range of interest with each seismic source, each seismic source may emit a single frequency at a time, with the frequency varying according to a programmed schedule. The programmed schedules may be arranged so that each seismic source emits simultaneously, but on a unique frequency that can be distinguished from the frequency used by every other seismic source emitting at that time. Furthermore, the programmed schedules may be arranged so that, over the course of the programmed schedules' duration, each seismic source emits at substantially all frequencies of interest. The time during which the particular seismic source covers the desired range of frequencies may be referred to as an "emission cycle." Although this disclosure describes a particular type of programmed schedule, any suitable programmed schedule may be used.

Each data collection node may receive and record data corresponding to each frequency within the range of interest during an emission cycle. This set of data may be very large; for example, a data collection node may receive and record approximately one thousand samples per second over the course of an approximately three-hour emission cycle, resulting in over approximately ten million individual samples from each receiver connected to the data collection node. Transmitting the entire data set over a wireless link may be costly in both power and time. Therefore, each data collection node may process the data along with a signal table containing information about the programmed schedule to create a reduced data set for transmission. For example, in embodiments in which each seismic source emits a seismic signal at a single frequency at each particular time, the data collection node may identify the frequency emitted by each seismic source based on the signal table and the time. The data collection node may perform a Fourier analysis of the seismic signal data, then select for transmission a single complex number, or a single amplitude and phase corresponding to the frequency emitted by each seismic source. This process may reduce, for example, a minute's worth of samples to a single complex number for each seismic source, significantly reducing the amount of data transmitted for later processing. This reduction may in turn allow the use of low-bandwidth wireless links, and may also reduce power consumption enough to permit the system to be powered using solar energy.

FIG. 1 illustrates an elevation view of an example data collection node 100 in accordance with some embodiments of the present disclosure. Data collection node 100 includes one or more receivers 110 in communication with an acquisition unit 120. Acquisition unit 120 receives seismic data from receivers 110 and generates a reduced data set for transmission to relay unit 122 over wireless link 124.

Each receiver 110 is any type of instrument that is operable to transform seismic energy or vibrations into a recordable signal, for example a voltage or optical signal. Receiver 110 detects movements from elastic waves or other seismic energy below surface 140 and converts the motions into detectable energy, such as electric voltages or optical pulses. For example, receiver 110 may be a geophone configured to detect and record seismic energy reflected from subsurface formations. Receiver 110 may be a hydrophone or a vertical, horizontal, or multicomponent geophone. For example, receiver 110 may include a three component (3C) geophone, a 3C accelerometer, or a 3C Digital Receiver Unit (DSU). In some embodiments, receiver 110 may be a discrete optical sensor. In some embodiments, receivers 110 are positioned along one or more strings 130 which provide data communication between receivers 110 and acquisition unit 120. Each receiver 110 is typically spaced apart from adjacent receivers 110 in the string 130. Spacing between receivers 110 in string 130 may be approximately the same preselected distance, or span, or the spacing may vary depending on a particular application, exploration area topology, or any other suitable parameter. For example, spacing between receivers 110 may be approximately ten meters. Receivers 110 and strings 130 may be positioned in multiple configurations, such as linear, grid, array, or any other suitable configuration. In some embodiments, receivers 110 may be positioned at or near ground surface 140, as illustrated by configuration 132. In configuration 132, string 130 may be positioned on ground surface 140 or buried beneath ground surface 140. In some embodiments, receivers 110 may be positioned at locations below ground surface 140, as illustrated by configuration 134. In some embodiments, receivers 110 may be positioned at varying depths in an approximately vertical line, as illustrated by configuration 136. In some embodiments, receiver 110 and string 130 may be combined as a continuous sensing optical fiber or distributed acoustic sensing (DAS) system, in which the sensor interval is selectable by the choice of emitted wavelength of the optical pulses used in this sensing method. Such optical sensing fibers may be deployed horizontally, as illustrated by configuration 132, vertically, as illustrated by configuration 136, or at some other angle to vertical or in a borehole with a curved trajectory, as illustrated by configuration 134. In some embodiments, multiple configurations are used. Although this disclosure illustrates particular configurations of receivers 110 and strings 130, any suitable configuration or configurations may be used for a particular data collection node 100.

Acquisition unit 120 may include any instrumentation operable to compute, classify, process, transmit, receive, store, display, record, or utilize any form of information, intelligence, or data. For example, acquisition unit 120 may include processor 150, memory 152, storage unit 154, and battery 156. In some embodiments, processor 150 may include a central processing unit (CPU), field-programmable gate array (FGPA), application-specific integrated circuit (ASIC), digital signal processor (DSP), or other suitable or hardware or software control logic. In some embodiments, memory 152 may be random access memory (RAM) or other types of volatile or non-volatile memory. Memory 152 may store instructions for execution by processor 150, data being processed by processor 150, or other suitable information. Storage unit 154 may be a hard disk drive, solid-state disk drive, non-volatile memory, or other suitable data storage media. Battery 156 may store and provide power to the components of acquisition unit 120. In some embodiments, battery 156 may receive and store power from an external power source 160. In some embodiments, external power source 160 may be a solar panel mounted on pole 162. In some embodiments, external power source 160 may be another suitable power source, for example a wind turbine, a bendable piezoelectric generator, or a thermal generator. Acquisition unit 120 may also include additional components not shown, for example one or more network ports for communicating with external devices or one or more input/output (I/O) devices, such as a keyboard, a mouse, or a video display. Acquisition unit 120 may be configured to permit communication over any type of network, such as a wireless network, a local area network (LAN), or a wide area network (WAN) such as the Internet. Furthermore, acquisition unit 120 may be located in any suitable enclosure, and may be located at or near surface 140, beneath surface 140, within pole 162, or in any other suitable location. Components of acquisition unit 120 may be configured as separate units or as a single unit.

Acquisition unit 120 is in data communication with receivers 110 through strings 130, for example using electrical or optical fiber cables. In some embodiments, acquisition unit 120 receives an analog signal from receivers 110 and digitizes the analog signal. For example, acquisition unit 120 may sample the analog signal from each receiver 110 approximately every one to two milliseconds. In some embodiments, one or more receivers 110 digitize their data locally and send digitized samples to acquisition unit 120 over strings 130. For example, each receiver 110 may send approximately five hundred to one thousand samples per second to acquisition unit 120. In some embodiments, acquisition unit 120 stores the data received from receivers 110 on storage unit 154 or in memory 152 before, during, or after processing.

In some embodiments, acquisition unit 120 is also in data communication with relay unit 122 through wireless link 124. Wireless link 124 may be any type of wireless communication path that provides data transmission between acquisition unit 120 and relay unit 122. For example, wireless link 124 may include a WiFi network, cellular network, radio network, satellite link, or any other suitable wireless communication path. Relay unit 122 may include any instrumentation operable to receive data from acquisition unit 120. For example, relay unit 122 may include a computer, a wireless base station, a communications satellite, or other suitable equipment. In some embodiments, acquisition unit 120 may transmit data directly to relay unit 122. In some embodiments, acquisition unit 120 may be configured in a mesh network with other data collection nodes, as described below in connection with FIG. 2.

Figure 2:
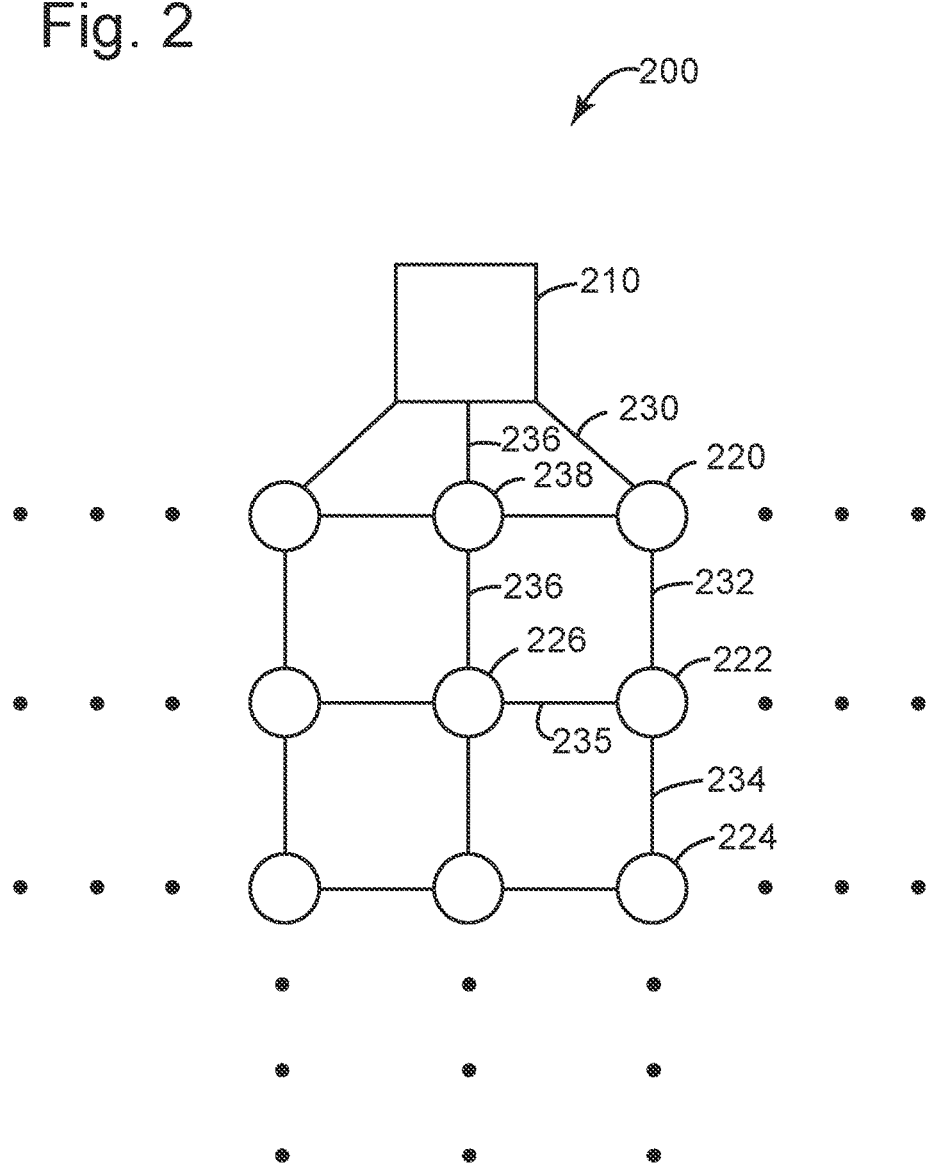
FIG. 2 illustrates a plan view of an example mesh network in accordance with some embodiments of the present disclosure.

FIG. 2 illustrates a plan view of an example mesh network 200 in accordance with some embodiments of the present disclosure. Mesh network 200 may include relay unit 210, data collection nodes 220 through 228, and wireless data links 230 through 238. In some embodiments, relay unit 210 may be an instance of relay unit 122 discussed in connection with FIG. 1. Data collection nodes 220 through 228 may be instances of data collection node 100 discussed in connection with FIG. 1. Wireless data links 230 through 238 may be instances of wireless data link 124 discussed in connection with FIG. 1. In mesh network 200, some data collection nodes are in direct communication with relay unit 210. For example, data collection node 220 is in direct communication with relay unit 210 over wireless link 230. Other data collection nodes communicate with relay unit 210 indirectly. For example, data collection node 224 may send its data to data collection node 222 over wireless link 234. Data collection node 222 may then forward the data to data collection node 220 over wireless link 232. Data collection node 220 may then forward the data to relay unit 210 over wireless link 230. Use of mesh network 200 may limit the amount of power required by the transmitter at each data collection node compared to using a direct link because the distance to an adjacent node in the mesh may be significantly smaller than the distance to relay unit 210. For example, data collection node 224 may be approximately a few hundred meters from data collection node 222 but over approximately one thousand meters from relay unit 210. In addition, mesh network 210 may provide fault tolerance. For example, if data collection node 220 fails so that it cannot transmit data to relay unit 210, the indirect data path described above may cease to operate. In that case, data collection node 224 may transmit its data through data collection nodes 222, 226, and 228 and wireless links 234, 235, 236, and 238 instead. Although a particular configuration of a mesh network is illustrated, other configurations and other paths may be used. For example, in some embodiments data collection node 224 may transmit its data along a diagonal path (not shown) to data collection node 226.

Returning to FIG. 1, relay unit 122 may be in data communication with data processing center 170 over network 172. Data processing center 170 may include any instrumentation operable to compute, classify, process, transmit, receive, store, display, record, or utilize any form of information, intelligence, or data. For example, data processing center may include one or more personal computers, storage devices, servers, or any other suitable device and may vary in size, shape, performance, functionality, and price. Network 172 may be any type of network that provides communication. For example, network 172 may include one or more of a wireless network, a local area network (LAN), or a wide area network (WAN), such as the Internet.

In operation, acquisition unit 120 may transmit to relay unit 122 a reduced data set based on the data it receives from receivers 110. For example, acquisition unit 120 may identify data corresponding to the seismic signals emitted by the seismic sources used in the monitoring operation.

Each seismic source may comprise any type of seismic device that generates controlled seismic energy used to perform reflection or refraction seismic surveys, such as a piezoelectric source, SEISMOVIE™, or any other suitable seismic source. Each seismic source may radiate varying frequencies or one or more monofrequencies of seismic energy into surface 140 and subsurface formations during a defined interval of time. Each source may impart energy continuously. A SEISMOVIE™ system may emit energy at individual frequencies, one-by-one, according to a programmed schedule, until approximately an entire selected frequency band is emitted. Furthermore, the programmed schedules may be arranged so that, over the course of the programmed schedules' duration, each seismic source emits at substantially all frequencies of interest. When emitted signals are generated utilizing a SEISMOVIE™ system, signals at one or more specific frequencies may not be emitted, which may result in higher seismic exploration efficiency. Signals from a SEISMOVIE™ system may also be emitted at a different energy level for each frequency.

In some embodiments, the seismic signals emitted by the seismic sources may be chosen to be "orthogonal" to one another, so that subsequent processing of the reflected seismic signals can distinguish the energy contributed by one seismic source from that contributed by other seismic sources. For example, to cover the entire frequency range of interest with each seismic source, each seismic source may emit a single frequency at a time, with the frequency varying according to a programmed schedule. Multiple seismic sources may emit simultaneously, but at any given time each seismic source may emit a seismic signal at a single frequency different from all frequencies emitted by other seismic sources in the system, and different from all harmonics of the frequencies emitted by other seismic sources in the system. In such an example system, the energy contributed by a particular seismic source may be identified by applying a Fourier transformation to the reflected seismic signal to transform the data into the frequency domain, then selecting from the resulting frequency-domain data the complex number corresponding to the frequency emitted by the particular seismic source. In some embodiments, an amplitude and phase corresponding to the frequency emitted by the particular seismic source may be selected.

The selection of particular complex numbers, or particular amplitudes and phases, from the frequency-domain data may significantly reduce the amount of data needed to represent useful information about the seismic signal. For example, in some embodiments, the seismic monitoring system may include approximately one hundred seismic sources, each operating on a different single frequency at a particular time, and each acquisition unit 120 may receive a sample approximately every millisecond from each associated receiver 110. In such an embodiment, the raw seismic data from a single receiver 110 may contain approximately one thousand samples per second and approximately 60,000 samples per minute. By contrast, acquisition unit 120 may apply a Fourier transform to the entire data set, for example approximately 60,000 samples, then select the approximately one hundred complex numbers corresponding to the approximately one hundred frequencies emitted by the approximately one hundred seismic sources. As a result, acquisition unit 120 may only transmit the approximately one hundred complex numbers to relay unit 122, rather than the entire set of approximately 60,000 samples.

As described above, the single frequency used by each seismic source may vary over time, according to a programmed schedule, to cover a selected range of frequencies. For example, a particular seismic source may emit a monofrequency seismic signal at a frequency of approximately one hertz (Hz) from approximately 12:00:00 pm GMT to approximately 12:01:00 pm GMT. The particular seismic source may emit a monofrequency seismic signal at a frequency of approximately two Hz from approximately 12:01:00 pm GMT to approximately 12:02:00 GMT. The particular seismic source may continue to increase the frequency of its seismic signal approximately every minute. In this fashion, the particular seismic source may emit seismic signals at substantially all of the frequencies in the selected range. For example, the particular seismic source may emit seismic signals at substantially all of the frequencies between approximately zero Hz and approximately three hundred Hz. The time during which the particular seismic source covers the desired range of frequencies may be referred to as an "emission cycle." For example, the particular energy source may cover the desired range of frequencies in approximately three to four hours. At the end of an emission cycle, the particular seismic source may begin another emission cycle.

In some embodiments, a "signal table" listing the signal parameters used by a particular seismic source, and the times at which each of those parameters are used by the particular seismic source, may be provided to acquisition unit 120. For example, the signal table may contain a series of single frequencies, and a start and stop time for each frequency, covering a 24-hour day, as illustrated in Table 1:

TABLE 1

Sample signal table

| Start time | Stop time | Frequency |
|---|---|---|
| 12:00:00 pm GMT | 12:01:00 pm GMT | 1 Hz |
| 12:01:00 pm GMT | 12:02:00 pm GMT | 2 Hz |
| 12:02:00 pm GMT | 12:03:00 pm GMT | 3 Hz |
| ... | | |
| 03:58:00 pm GMT | 03:59:00 pm GMT | 239 Hz |
| 03:59:00 pm GMT | 04:00:00 pm GMT | 240 Hz |
| 04:00:00 pm GMT | 04:01:00 pm GMT | 1 Hz |
| 04:01:00 pm GMT | 04:02:00 pm GMT | 2 Hz |
| ... | | |
| 11:58:00 am GMT | 11:59:00 am GMT | 239 Hz |
| 11:59:00 am GMT | 12:00:00 pm GMT | 240 Hz |

In some embodiments, acquisition unit 120 may be provided a signal table for each seismic source in the system. For example, in a system including approximately one hundred seismic sources, acquisition unit 120 may be provided approximately one hundred signal tables.

In operation, acquisition unit 120 may use the information in the signal table to generate a reduced data set based on the data received from receivers 110, as described in more detail in connection with FIG. 3 below. For example, acquisition unit 120 may perform a Fourier transformation on the data collected between 12:01:00 pm GMT and 12:02:00 pm GMT, then select the complex number corresponding to the frequency listed for that time period in Table 1 (for example, 2 Hz) for transmission to relay unit 122. Acquisition unit 120 may perform this selection for each signal table. As a result, in the example system containing one hundred seismic sources as described above, the reduced data set may contain one hundred complex numbers, as compared to the 60,000 samples in the entire raw data set. Consequently, the reduced data set may require significantly less power or less time to transmit to relay unit 122 than would the entire raw data set.

Although this disclosure discusses a particular type of orthogonal signal and a particular sample signal table, any appropriate signals and signal tables may be used.

Figure 3:
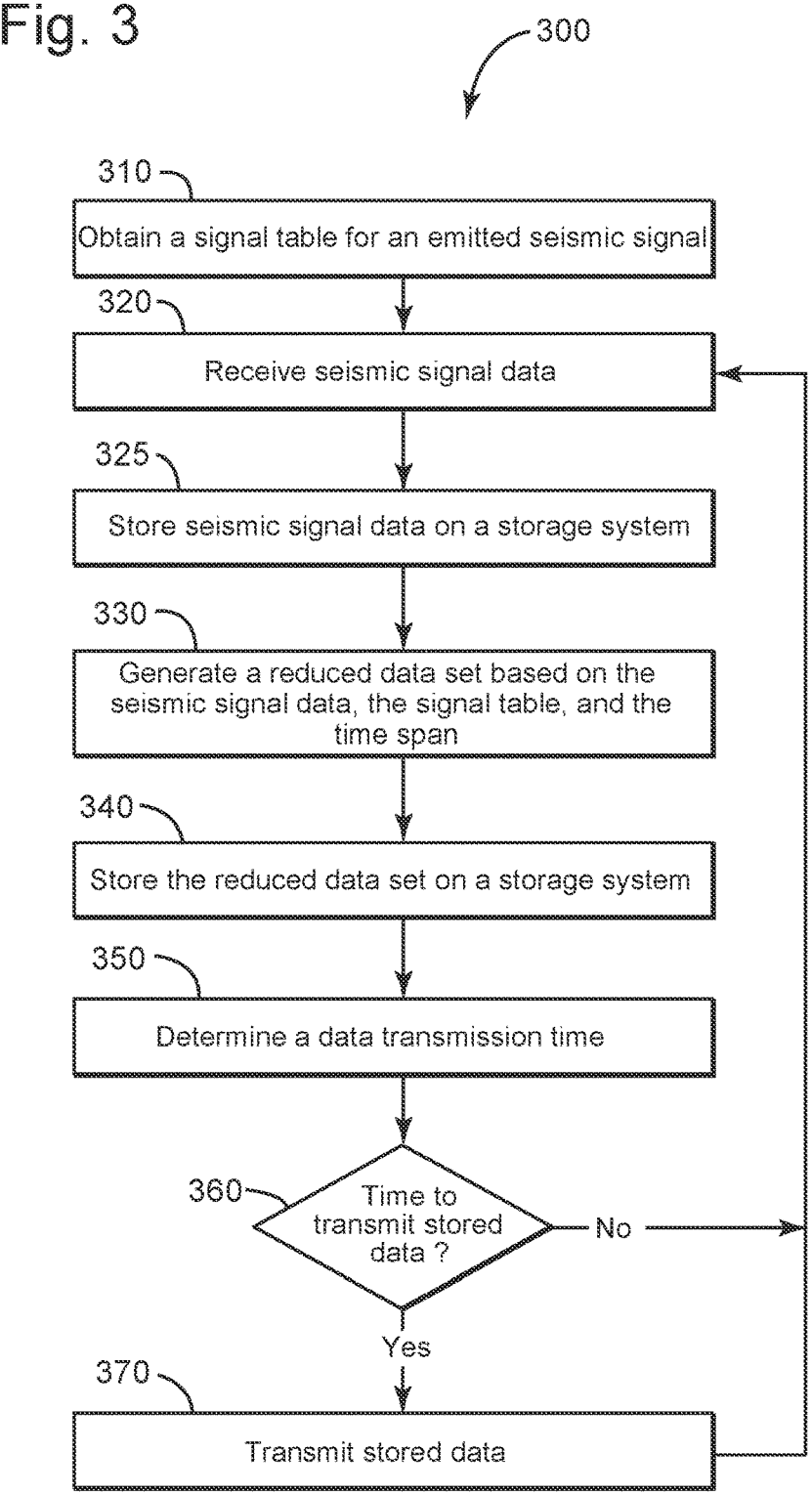
FIG. 3 illustrates a flow chart of an example method for wireless data acquisition in accordance with some embodiments of the present disclosure.

FIG. 3 illustrates a flow chart of an example method 300 for wireless data acquisition in accordance with some embodiments of the present disclosure. For illustrative purposes, method 300 is described with respect to a land-based seismic monitoring system; however, method 300 may be used to perform wireless data collection in any appropriate seismic monitoring system. The steps of method 300 can be performed by a user, electronic or optical circuits, various computer programs, models, or any combination thereof, configured to generate pilot signals for a vibratory seismic source. The programs and models may include instructions stored on a non-transitory computer-readable medium and operable to perform, when executed, one or more of the steps described below. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer readable media. Collectively, the user, circuits, or computer programs and models used to generate a pilot signal may be referred to as a "processing tool." For example, the processing tool may be acquisition unit 120, discussed with reference to FIG. 1.

In step 310, the processing tool obtains a signal table for an emitted seismic signal. For example, the processing tool may determine the signal table illustrated in Table 1, discussed in connection with FIG. 1. The signal table may contain parameters defining the seismic signal emitted by a particular seismic source at particular times. For example, the signal table may define a single frequency emitted by the particular source during each one-minute interval during a day, as illustrated in Table 1. Although this disclosure discusses a particular type of seismic signal, any suitable seismic signal and signal table may be used.

In step 320, the processing tool receives seismic signal data from a receiver. For example, acquisition unit 120, discussed with reference to FIG. 1 may receive approximately 60,000 samples from a particular receiver 110 every minute.

In step 325, the processing tool stores the seismic signal data received in step 320 on a storage system. For example, acquisition unit 120, discussed with reference to FIG. 1, may store the seismic signal data received in step 320 to storage unit 154.

In step 330, the processing tool determines a time span for the seismic signal data received in step 320. For example, in embodiments where acquisition unit 120, discussed with reference to FIG. 1, digitizes an analog signal provided by receiver 110, acquisition unit 120 may determine, using a Global Positioning System (GPS) device, the time at which it digitizes each sample. In embodiments where acquisition unit 120 receives digitized sample data from receiver 110, acquisition unit 120 may determine, using a GPS device, the time at which it receives each sample The processing tool may record the time determined for each sample. The processing tool may further determine an earliest time and a latest time among the times for the samples. For example, the processing tool may determine that the seismic signal data received in step 320 were digitized between 12:01:00 pm GMT and 12:02:00 pm GMT.

In step 340, the processing tool generates a reduced data set based on the seismic signal data, the source signal table, and the time span. In some embodiments, the processing tool may select a subset of the seismic signal data. For example, in embodiments in which each seismic source emits a single frequency during each one-minute interval during a day, the processing tool may apply a Fourier transformation to the seismic signal data received in step 320, to transform the data into the frequency domain. The processing tool may look up, in the signal table determined in step 310, the emitted frequency for the time span determined in step 330. The processing tool may select from the frequency-domain data the complex number corresponding to the emitted frequency listed in the signal table. In some embodiments, the processing tool may select an amplitude and phase corresponding to the emitted frequency listed in the signal table. For example, acquisition unit 120, discussed with reference to FIG. 1, may determine, using the signal table illustrated in Table 1, that the particular seismic source emitted a seismic signal at approximately two Hz during the one-minute time span from approximately 12:01:00 pm GMT to approximately 12:02:00 pm GMT. As a result, acquisition unit 120 may select the complex number corresponding to approximately two Hz from the frequency-domain data. In some embodiments, the processing tool may generate a reduced data set based on other suitable functions of the seismic signal data, the source signal table, and the time span.

In step 350, the processing tool stores the reduced data set on the storage system. For example, acquisition unit 120, discussed with reference to FIG. 1, may store the complex number selected in step 340 to storage unit 154. In some embodiments, the processing tool may further store the time span determined in step 330. In some embodiments, the processing tool may merge the reduced data set generated in step 340 with other data on the storage system. For example, acquisition unit 120 may determine that a complex number corresponding to approximately two Hz is already present on storage unit 154, for example when acquisition unit 120 has completed a full emission cycle since the last time it transmitted data to relay unit 122. Acquisition unit 120 may merge the complex number selected in step 340 with the complex number already present on storage system 154. In some embodiments, acquisition unit 120 may perform a vector sum of the complex number selected in step 340 and the complex number already present on storage system 154. In some embodiments, acquisition unit 120 may compute a difference between the complex number selected in step 340 and the complex number already present on storage system 154. In some embodiments, acquisition unit 120 may compute a ratio between the complex number selected in step 340 and the complex number already present on storage system 154. Acquisition unit may store the resulting merged data back on storage system 154.

In step 360, the processing tool determines a data transmission time. In some embodiments, the processing tool may transmit data at a fixed time of day. For example, the processing tool may transmit data every day at approximately 12:00:00 GMT. In some embodiments, the processing tool may transmit data after a predetermined interval has elapsed. For example, the processing tool may transmit data at the end of each emission cycle, for example approximately every three to four hours. In some embodiments, the processing tool may transmit data in real time or near-real time. For example, the processing tool may determine that each reduced data set generated in step 340 should be transmitted as soon as it is computed, for example approximately every sixty seconds. In some embodiments, the processing tool may not transmit data until signaled to transmit by an operator.

In step 370, the processing tool determines whether the data transmission time has occurred. If the processing tool determines that the data transmission time has occurred, it proceeds to step 380. Otherwise, it returns to step 320.

In step 380, the processing tool transmits the stored data. For example acquisition unit 120, discussed with reference to FIG. 1, may transmit the stored data stored on storage system 154 in step 350 to relay unit 122 over wireless link 124. As another example, acquisition unit 120 may transmit the stored data to another data collection node 100 in a mesh network, as discussed in connection with FIGS. 1 and 2. In some embodiments, the processing tool may erase the stored data after transmission. For example, in some embodiments, the processing tool may cause new data to overwrite the stored data after acquisition unit 120 transmits the stored data to relay unit 122. In some embodiments in which acquisition unit 120 is merging the selected data with the stored data in step 350, acquisition unit 120 may reset to zero the complex numbers stored for each frequency for a particular seismic source, after acquisition unit 120 transmits the stored data to relay unit 122. After transmitting the stored data, the processing tool may return to step 320.

Modifications, additions, or omissions may be made to method 400 without departing from the scope of the present disclosure. For example, the steps may be performed in a different order than that described and some steps may be performed at the same time. Further, more steps may be added or steps may be removed without departing from the scope of the disclosure.

Figure 4:
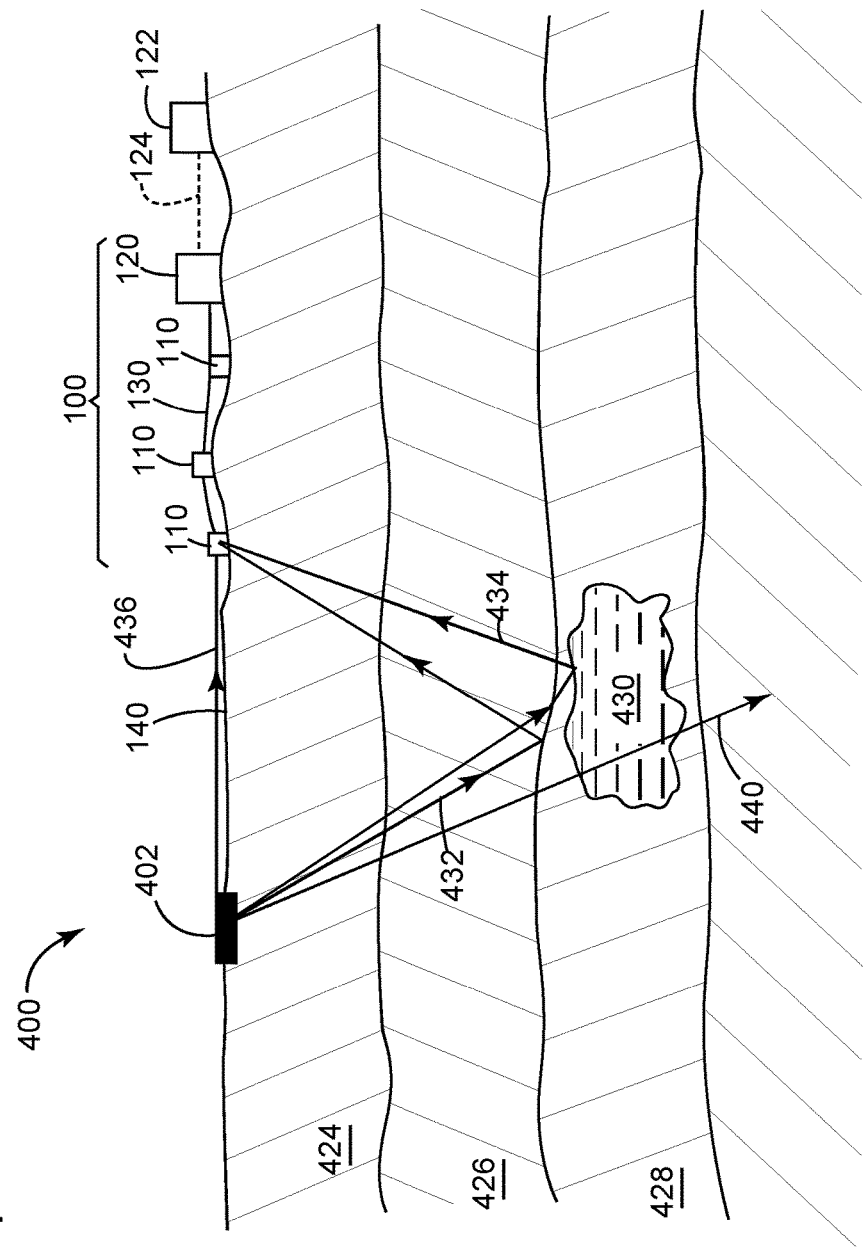
FIG. 4 illustrates an elevation view of an example seismic monitoring system configured to produce images of the earth's subsurface geological structure in accordance with some embodiments of the present disclosure.

FIG. 4 illustrates an elevation view of an example seismic monitoring system configured to produce images of the earth's subsurface geological structure in accordance with some embodiments of the present disclosure. The images produced by system 400 allow for the evaluation of subsurface geology. System 400 may include one or more seismic sources 402 and one or more data collection nodes 100 which are located within a pre-determined exploration area. Data collection node 100 may include one or more receivers 110 and acquisition unit 120, as described in more detail in connection with FIG. 1. The exploration area may be any defined area selected for seismic survey or exploration. Survey of the exploration area may include the activation of seismic source 402 that radiates an acoustic wave field that expands downwardly through the layers beneath the earth's surface. The seismic wave field is then partially reflected and refracted from the respective layers as a wave front received by receivers 110. For example, source 402 generates seismic waves and receivers 110 receive rays 432 and 434 reflected by interfaces between subsurface layers 424, 426, and 428, oil and gas reservoirs, such as target reservoir 430, or other subsurface structures. Subsurface layers 424, 426, and 428 may have various densities, thicknesses, or other characteristics. Target reservoir 430 may be separated from surface 140 by multiple layers 424, 426, and 428. As the embodiment depicted in FIG. 4 is exemplary only, there may be more or fewer layers 424, 426, or 428 or target reservoirs 430. Similarly, there may be more or fewer rays 432 and 434. Additionally, some source waves will not be reflected, as illustrated by ray 440.

Seismic source 402 may be referred to as an acoustic source, seismic source, energy source, and source 402. In some embodiments, source 402 is located on or proximate to surface 140 of the earth within an exploration area. In some embodiments, source 402 may be buried below ground surface 140, for example in a horizontal, vertical, or angled wellbore. A particular source 402 may be spaced apart from other similar sources. Source 402 may be operated by a central controller that coordinates the operation of several sources 402. Further, a positioning system, such as a GPS, may be utilized to locate and time-correlate sources 402 and receivers 110. Multiple sources 402 may be used to improve testing efficiency, provide greater azimuthal diversity, improve the signal to noise ratio, and improve spatial sampling. The use of multiple sources 402 can also input a stronger signal into the ground than a single, independent source 402. Sources 402 may also have different capabilities and the use of multiple sources 402 may allow for some sources 402 to be used at lower frequencies in the spectrum and other sources 402 at higher frequencies in the spectrum.

Source 402 may comprise any type of seismic device that generates controlled seismic energy used to perform reflection or refraction seismic surveys, such as a piezoelectric source, SEISMOVIE™, or any other suitable seismic source, as described in more detail in connection with FIG. 1. Source 402 may radiate varying frequencies or one or more monofrequencies of seismic energy into surface 140 and subsurface formations during a defined interval of time. Source 402 may impart energy continuously. A SEISMOVIE™ system may emit energy at individual frequencies, one-by-one, according to a programmed schedule, until approximately the entire frequency band is emitted. Furthermore, the programmed schedules may be arranged so that, over the course of the programmed schedules' duration, each seismic source emits at substantially all frequencies of interest. When emitted signals are generated utilizing a SEISMOVIE™ system, signals at one or more specific frequencies may not be emitted, which may result in higher seismic exploration efficiency. Signals from a SEISMOVIE™ system may also be emitted at a different energy level for each frequency. Source 402 may be a permanent seismic device and may be buried beneath surface 140.

Seismic monitoring system 400 may include data collection node 100 that operates to record reflected and refracted energy rays 432, 434, and 436. As described in connection with FIG. 1, data collection node 100 may include one or more receivers 110, strings 130, and acquisition unit 120. Seismic monitoring system 400 may also include relay unit 122 and wireless link 124. In some embodiments, data collection node 100 may be located remotely from source 402.

Receiver 110 may be located on or proximate to surface 140 of the earth within an exploration area. Receiver 110 may also be buried beneath surface 140. Receiver 110 may be any type of instrument that is operable to transform seismic energy or vibrations into a recordable signal, for example a voltage or optical signal. For example, receiver 110 may be a hydrophone or a vertical, horizontal, or multicomponent geophone, accelerometers, or optical fiber with wire or wireless data transmission, such as a three component (3C) geophone, a 3C accelerometer, a 3C Digital Sensor Unit (DSU), a discrete optical sensor, a continuous sensing optical fiber, or a distributed acoustic sensing (DAS) system, as discussed above in connection with FIG. 1. Multiple receivers 110 may be utilized within an exploration area to provide data related to multiple locations and distances from sources 402. Receivers 110 may be positioned in multiple configurations, such as linear, grid, array, or any other suitable configuration. In some embodiments, receivers 110 may be positioned beneath surface 140 in a horizontal layout, a vertical layout, or some combination thereof, as discussed above in connection with FIG. 1. In some embodiments, receivers 110 may be positioned along one or more strings 130. Each receiver 110 is typically spaced apart from adjacent receivers 110 in the string 130. Spacing between receivers 110 in string 130 may be approximately the same preselected distance, or span, or the spacing may vary depending on a particular application, exploration area topology, or any other suitable parameter. In embodiments using continuous sensing optical fibers or DAS systems, an optical sensing fiber may be deployed horizontally, vertically, or at some other angle to vertical or in a borehole with a curved trajectory, and the length and configuration of the fiber may vary depending on a particular application, exploration area topology, or any other suitable parameter.

As described in more detail in connection with FIGS. 1-3, receivers 110 transmit seismic signal data to acquisition unit 120 via string 130. Acquisition unit 120 generates a reduced data set based on the seismic signal data from receivers 110 and a signal table containing information about the seismic signal emitted by source 402. For example, acquisition unit 120 may compute a Fourier transform of the seismic signal data from receivers 110 and select the complex number corresponding to the frequency emitted by seismic source 402, as discussed in more detail in connection with FIG. 3. Acquisition unit 120 transmits the reduced data set to relay unit 122 via wireless link 124.

The seismic survey may be repeated continuously or at various time intervals to determine changes in target reservoir 430. The time intervals may be months or years apart. Data may be collected and organized based on offset distances, such as the distance between a particular source 402 and a particular receiver 110 and the amount of time it takes for rays 432 and 434 from a source 402 to reach a particular receiver 110. Data collected during a survey by receivers 110 may be reflected in traces that may be gathered, processed, and utilized to generate a model of the subsurface structure or variations of the structure, for example continuous or 4D monitoring.

Although discussed with reference to a land implementation, embodiments of the present disclosure may also be useful in marine applications. In a marine application, receivers 110 may include hydrophones contained inside buoyant streamers or positioned on or beneath the seafloor.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but must be configured to receive reflected energy.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. For example, the computer processor may serve to receive the seismic signal data, determine the time span, and generate, store, and transmit the reduced data set as described in steps 420, 430, 440, 450, and 460 with respect to FIG. 4.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the present disclosure is defined by the appended claims.

What is claimed is:

1. A method for seismic data acquisition performed by a collection node during a seismic survey of a subsurface geological formation, the method comprising:
    obtaining a signal table for an emitted seismic signal;
    receiving seismic signal data from a receiver configured to transform seismic signals emerging from the subsurface geological structure into seismic signal data;
    storing the seismic signal data on a storage system;
    determining a time span for the seismic signal data; and
    generating a reduced data set based on the seismic signal data, the signal table, and the time span, wherein the generating includes:
    generating frequency-domain data by applying a Fourier transformation to the seismic signal data;
    determining an emitted frequency based on the signal table and the time span; and
    selecting an amplitude and phase from the frequency-domain data, the amplitude and phase corresponding to the emitted frequency.

2. The method of claim 1, further comprising:
    storing the reduced data set on the storage system;
    determining a data transmission time;
    determining whether the data transmission time has occurred; and
    in response to determining that the data transmission time has occurred, transmitting the reduced data set.

3. The method of claim 2, wherein storing the reduced data set comprises merging the reduced data set with other data on the storage system.

4. The method of claim 2, wherein transmitting the reduced data set occurs in real time or near-real time.

5. The method of claim 2, wherein the reduced data set is transmitted via a wireless link.

6. The method of claim 5, wherein the wireless link comprises a link in a mesh network.

7. The method of claim 1, further comprising using the reduced data set to generate an image of the subsurface geological structure, the image being useable to determine presence of oil and/or gas in the subsurface geological structure.

8. A seismic data acquisition system for performing a seismic survey of a subsurface geological formation, the seismic data acquisition system comprising:
a receiver configured to detect seismic signals emerging from the subsurface geological structure and to transform the seismic signals into seismic signal data;
a storage system, and
a collection node connected to the receiver and the storage system and having a processor and a memory communicatively coupled to the processor, wherein instructions stored in the memory, when executed by the processor, cause the processor to:
obtain a signal table for an emitted seismic signal;
receive the seismic signal data from the receiver;
store the seismic signal data on the storage system;
determine a time span for the seismic signal data; and
generate a reduced data set based on the seismic signal data, the signal table, and the time span,
wherein for generating the reduced data set, the processor performs:
generating frequency-domain data by applying a Fourier transformation to the seismic signal data;
determining an emitted frequency based on the signal table and the time span; and
selecting an amplitude and phase from the frequency-domain data, the amplitude and phase corresponding to the emitted frequency.

9. The system of claim 8, the instructions, when executed by the processor, further causing the processor to:
store the reduced data set on the storage system;
determine a data transmission time;
determine whether the data transmission time has occurred; and
in response to determining that the data transmission time has occurred, transmit the reduced data set.

10. The system of claim 9, wherein storing the reduced data set comprises merging the reduced data set with other data on the storage system.

11. The system of claim 9, wherein the reduced data set is transmitted via a wireless link.

12. The system of claim 9, wherein transmitting the reduced data set occurs in real time or near-real time.

13. A non-transitory computer-readable medium, comprising instructions that, when executed by a processor, cause the processor to
obtain a signal table for an emitted seismic signal;
receive seismic signal data from a receiver configured to transform seismic signals emerging from the subsurface geological structure into seismic signal data;
store the seismic signal data on a storage system;
determine a time span for the seismic signal data; and
generate a reduced data set based on the seismic signal data, the signal table, and the time span,
wherein for generating the reduced data set, the processor performs:
generating frequency-domain data by applying a Fourier transformation to the seismic signal data;
determining an emitted frequency based on the signal table and the time span; and
selecting an amplitude and phase from the frequency-domain data, the amplitude and phase corresponding to the emitted frequency.

14. The non-transitory computer-readable medium of claim 13, the instructions, when executed by the processor, further causing the processor to:
store the reduced data set on the storage system;
determine a data transmission time;
determine whether the data transmission time has occurred; and
in response to determining that the data transmission time has occurred, transmit the reduced data set.

15. The non-transitory computer-readable medium of claim 14, wherein storing the reduced data set comprises merging the reduced data set with other data on the storage system.

16. The non-transitory computer-readable medium of claim 14, wherein the reduced data set is transmitted via a wireless link.

17. The non-transitory computer-readable medium of claim 14, wherein transmitting the reduced data set occurs in real time or near-real time.

* * * * *